United States Patent
Patterson

(12) 
(10) Patent No.: US 6,257,077 B1
(45) Date of Patent: Jul. 10, 2001

(54) REMOTELY POWERED SENSING ARRANGEMENT FOR A ROTATABLE DEVICE

(76) Inventor: Alan C. Patterson, 2424 East Coon Lake Road, Howell, MI (US) 48843

( * ) Notice: Subject to any disclaimer, the term of this patent is extended or adjusted under 35 U.S.C. 154(b) by 0 days.

(21) Appl. No.: 09/149,524

(22) Filed: Sep. 8, 1998

(51) Int. Cl.[7] .............................. G01M 19/00; G01B 7/00
(52) U.S. Cl. ..................... 73/865.9; 340/680; 340/686.4; 340/686.5; 408/13; 408/16
(58) Field of Search .............................. 73/865.9; 33/640, 33/642; 408/1 R, 13, 16; 340/870.31–870.36, 680, 686, 686.4, 686.5

(56) References Cited

U.S. PATENT DOCUMENTS

| 3,963,364 | * | 6/1976 | Lemelson | 408/16 X |
| 4,008,633 | | 2/1977 | Gilbert | 82/3 |
| 4,291,600 | * | 9/1981 | Kawaguchi et al. | 82/1 C |
| 4,536,000 | * | 8/1985 | Röhm | 279/1 R |
| 4,742,470 | * | 5/1988 | Juengel | 340/680 X |
| 4,761,101 | * | 8/1988 | Zettl | 73/660 X |
| 4,893,027 | | 1/1990 | Kammerer et al. | 307/116 |
| 4,893,077 | * | 1/1990 | Auchtelonie | 324/207.17 |
| 5,297,439 | * | 3/1994 | Tyren et al. | 73/862.69 X |
| 5,408,132 | | 4/1995 | Fericean et al. | 307/116 |
| 5,504,425 | | 4/1996 | Fericean et al. | 324/207.16 |

FOREIGN PATENT DOCUMENTS

| 63-217203 | * | 9/1988 | (JP) | |
| 6-139487 | * | 5/1994 | (JP) | 340/870.01 |

OTHER PUBLICATIONS

Derwent Information Ltd Abstract of SU 1755032 A1 Inventor V.A. Krysanov, Aug. 15, 1992.*

* cited by examiner

Primary Examiner—Thomas P. Noland
(74) Attorney, Agent, or Firm—Brooks & Kushman P.C.

(57) ABSTRACT

A remotely powered electronic part sensing system is integrated with a chuck of a rotatable device such as a lathe machine for sensing the position of a part after loading of the part onto the lathe. The sensing system includes a detecting sensor arrangement, a transmitter, and an output sensor/receiver. The detecting sensor and transmitter are electrically connected to each other and integrated into the chuck, while the output sensor/receiver is mounted to a support member of the lathe. The output sensor/receiver is directly wired to an electrical power source in a conventional manner, while electrical power for the transmitter and detecting sensor arrangement is generated remotely, i.e., wirelessly, through an inductive coupling arrangement between the transmitter and output sensor/receiver. The transmitter and all sensors are located under the chuck face plate to minimize potential system fail due to contact with coolant and machine chips.

5 Claims, 2 Drawing Sheets

REMOTELY POWERED SENSING ARRANGEMENT FOR A ROTATABLE DEVICE

TECHNICAL FIELD

The present invention generally relates to lathe machinery, and more particularly to an improved part sensing arrangement used with a chuck arrangement in a rotatable device such as a lathe machine.

BACKGROUND ART

In general, a typical lathe machine, such as an automated machine used in a commercial manufacturing environment, includes a chuck for clamping a part or workpiece to be machined, and a spindle arrangement connected to the chuck and a drive/drive control mechanism to cause desired rotation or movement of the part during the machining process. Parts are successively fed in and out of the lathe by a loading mechanism, and positioning of each these parts relative to the chuck when loaded is critical to the overall efficiency of the machining process and quality of the machined parts. Thus, a sensing arrangement is typically employed for sensing the presence or position of a part to allow a control processor to automatically detect when a part is ready for machining.

To date, because of the difficulty in delivering electrical power to a location on the chuck, known chucking arrangements have used either an air sensing arrangement coupled to the chuck, or sensor arrangements not located on the chuck. Air sensing arrangements have been formed by using a rotary union to inject compressed air into the chuck. However air circuits are limited in the input obtained from the circuit and are subject to contamination and are therefore a service issue. Additionally the compressed air is relatively expensive for a plant to supply. With respect to electronic sensing arrangements, a high speed and sealed commutator is not readily available for chuck applications. Sensing arrangements which are not located on the chuck suffer from reliability concerns as well as increased cost and complexity.

Therefore, a need exists for an electronic sensing arrangement which can be positioned on a chuck.

DISCLOSURE OF INVENTION

It is therefore an object of the present invention to provide an electronic sensing arrangement integrated with a lathe chuck for sensing whether a loaded part is in proper position.

It is another object of the present invention to provide a system and method for sensing the position of a part loaded into a lathe which utilizes a remote transmitter and a proximity sensor positioned on the chuck, and an output sensor/receiver mounted to a stationary part of the lathe.

It is still another object of the present invention to provide a system and method for sensing the position of a part loaded into a lathe in which a remote transmitter and proximity sensor mounted to the chuck is remotely powered through an inductive coupling with an output sensor/receiver mounted to a stationary member of the lathe.

In accordance with these and other objects, a first aspect of the present invention provides a system for sensing positioning of a part to be machined in a rotatable machining device, wherein the rotatable machining device includes a chuck for clamping the part during machining. The system includes a detecting sensor arrangement located on the chuck and having at least one proximity sensor positioned behind a face plate of the chuck to generate an output signal indicative of the position of the part relative to the face plate. A transmitter is located on the chuck and connected to the at least one proximity sensor for transmitting the generated sensor output signal(s), and an output sensor is located on a stationary member of the machining device for receiving the transmitted sensor output signal(s). The output sensor is directly connected to an electrical power source and includes a coil arranged relative to a coil located in the transmitter for inductively providing electrical power to the transmitter and detecting sensor arrangement.

In accordance with another aspect of the present invention, a method is provided for sensing positioning of a part to be machined in a rotatable machining device, wherein the rotatable machining device includes a chuck for clamping the part during machining. The method includes positioning a detecting sensor arrangement and transmitter on the chuck, positioning an output sensor on a stationary surface of the rotatable device. A signal is generated from the detecting sensor arrangement indicative of the position of the part relative to a face surface on the chuck, and then transmitted by the transmitter to the output sensor. Power is provided to the output sensor by directly coupling the output sensor to a source of electrical power, and power is provided to the transmitter and the detecting sensor arrangement by inductively coupling the output sensor and the transmitter.

In accordance with still another aspect of the present invention, a rotatable machining device is provided including a chuck for clamping part to be machined during a machining cycle, and a subsystem for sensing positioning of the part to be machined. The subsystem includes a detecting sensor arrangement located on the chuck for generating an output signal indicative of the position of the part relative to a face plate on the chuck, a transmitter located on the chuck and connected to the detecting sensor arrangement for transmitting the generated output signal, and an output sensor located on a stationary member of the machining device for receiving the transmitted output signal. A controller is connected to the output sensor for suspending the machining cycle if the received output signal is indicative that the part is not properly positioned within the chuck. Power for the output sensor is provided by direct connection to an electrical power source. A coil is provided within the output sensor and is arranged relative to a coil located in the transmitter for inductively providing electrical power to the transmitter and detecting sensor arrangement.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
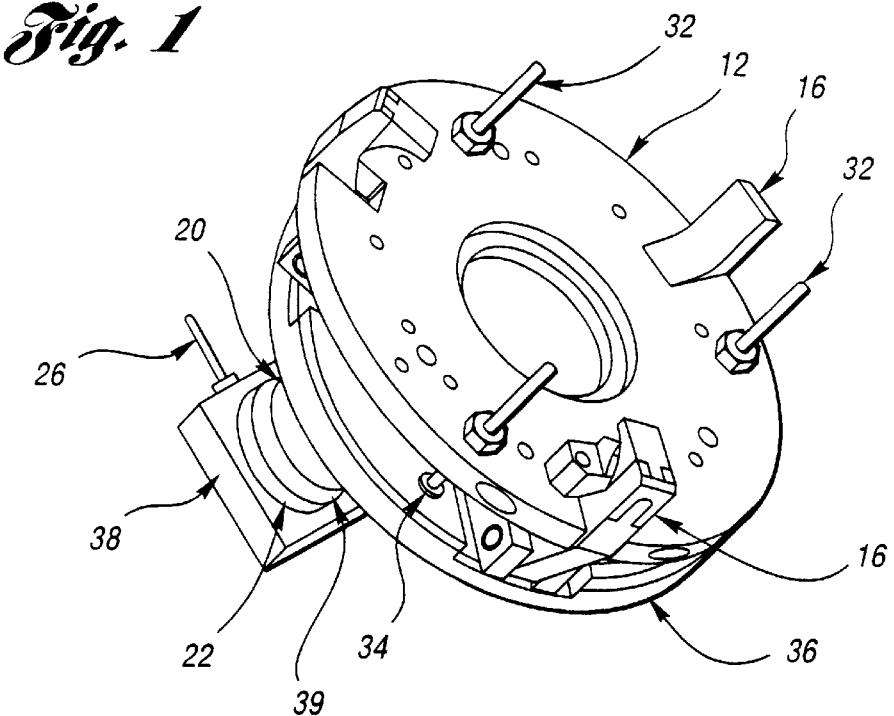
FIG. 1 is a perspective view of lathe chuck integrated with a remotely powered part sensing arrangement in accordance with the present invention.
Figure 2:
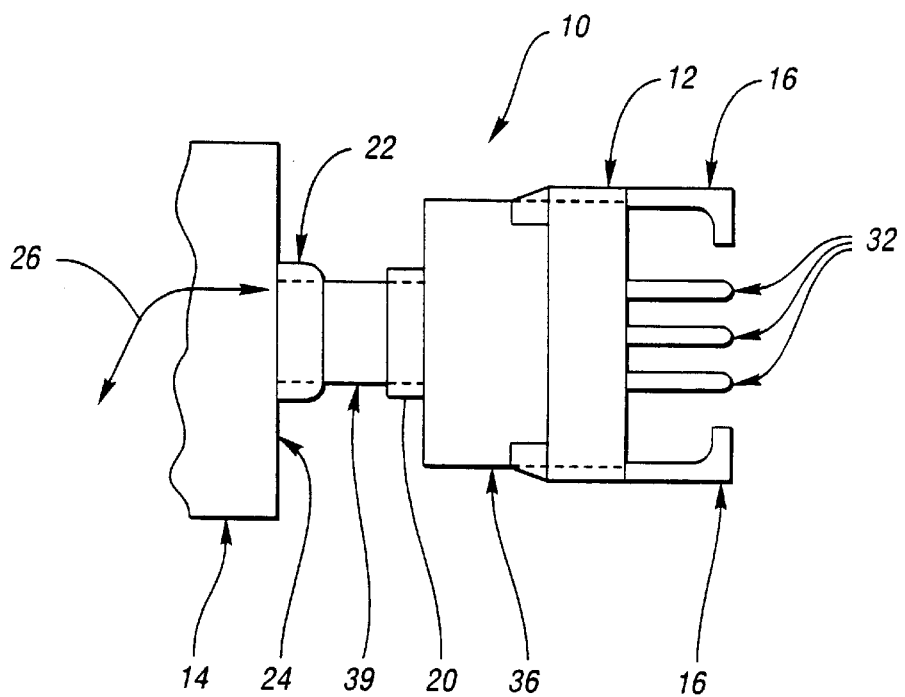
FIG. 2 is a side view representation of the remotely powered part sensing arrangement of the present invention.

Referring to FIGS. 1 and 2, a remotely powered electronic part sensing system 10 is shown integrated with a chuck 12 of a rotatable device such as a lathe machine 14 for sensing the position of a part after loading of the part onto the lathe. The chuck and lathe machine can be of conventional design and operation which are well known to one of ordinary skill in the art. For example, the chuck can include three remotely controlled clamps 16 which open and close to hold a loaded part in place during the machining operation. Except as otherwise described below, the specific components of the chuck and lathe machine do not form a part of the present invention and will not be described in further detail. In addition, while the present invention is described in connection with a lathe machine, it will be appreciated that the remotely powered sensing system of the present invention could be utilized in a chuck of any type of rotatable machine.

Sensing system 10 includes a detecting sensor arrangement 18, a transmitter 20, and an output sensor/receiver 22. Detecting sensor 18 and transmitter 20 are electrically connected to each other and integrated into chuck 12, while output sensor/receiver 22 is mounted to a support member 24 of the lathe. Output sensor/receiver 22 is directly wired to an electrical power source 25 in a conventional manner. Output sensor/receiver 22 is also connected a control processor via a wire bundle 26. A wire for providing the electrical power can be contained within wire bundle 26.

In accordance with the present invention, electrical power for transmitter 20 and detecting sensor arrangement 18 is generated remotely, i.e., wirelessly, through an inductive coupling arrangement between the transmitter and output sensor/receiver 22. More specifically, output sensor/receiver 22 is arranged to generate an inductive field using a coil 28. Transmitter 20 includes a coil 30 positioned relative to coil 28 so as to produce an output current and voltage as a result of mutual inductance between the two coils. Transmitter 20 is arranged with suitable processing circuitry so as to generate a dc voltage from the current induced in coil 30 for powering both the transmitter circuitry and the detecting sensor arrangement circuitry. The amount of drive current generated by the transmitter is a function of the distance between output sensor 22 and transmitter 20.

Figure 3:
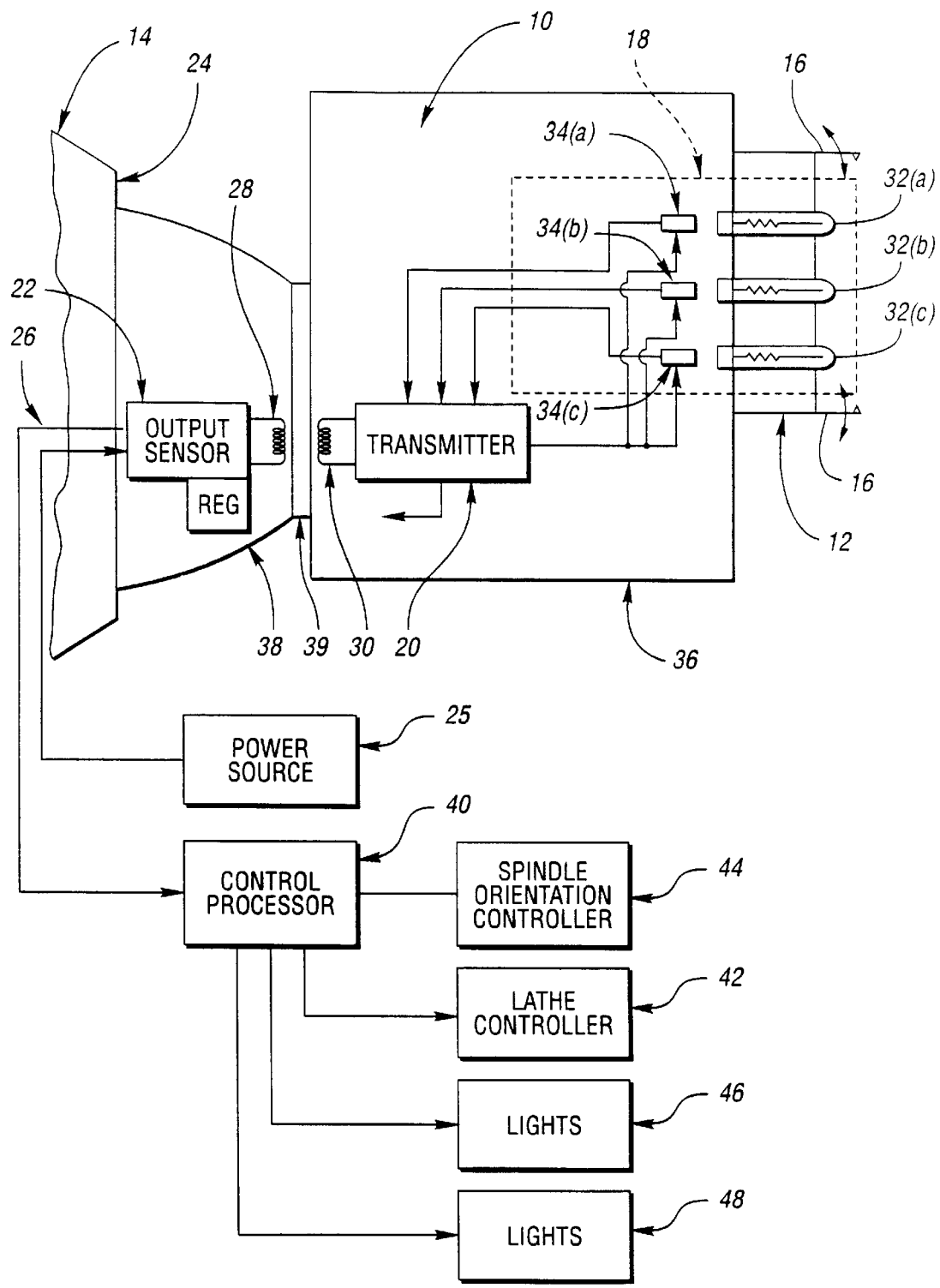
FIG. 3 is a block diagram of the remotely powered sensing system of FIGS. 1 and 2.

Referring now to the block diagram of FIG. 3, in a preferred embodiment, detecting sensor arrangement 18 includes a set of spring loaded metal probes 32(a)–(c) mounted to chuck 12 so as to be in a position to contact the part during loading. Loading of the part will push each respective probe 32 back through the chuck so as to be positioned within the sensing field of a corresponding proximity switch 34(a)–(c) mounted within an aluminum carrier ring 36 In the embodiment shown in FIGS. 1–3, three probes are designed to contact the part at 120° increments. Such an arrangement allows confirmation that the part is loaded squarely to the chuck face plate. However, such an embodiment is not to be construed as limiting since additional probes and switches may be used depending on specific user requirements and the type or contour of part being machined. For example, a fourth probe can be positioned to make contact with a part only if the part has not been loaded backwards.

As noted above, aluminum carrier ring 36 is used in conjunction with chuck 12 for mounting the transmitter and detecting sensor switches to the chuck. All wiring (not shown) used to connect the transmitter and detecting sensor is buried and sealed within this ring. Installation involves mounting the ring to one end of the chuck such as by using one or more bolts (not shown). The metal probe are mounted so as to be positioned over the corresponding proximity sensors within the attached ring 36. Each probe is arranged to clear the field of a proximity sensor when a part is either not loaded, or loaded askew to the chuck, thus preventing the proximity switch from closing a sensor loop circuit. The spring loading of the probes provides over-travel handling to minimize crush damage to the proximity sensors. Transmitter 20 can be arranged in accordance with known design principals to provide either optical (i.e., infrared), ultrasonic, or RF type of signal transmission.

Output sensor/receiver 22 is located within a housing 38 which is preferably mounted onto the stationary sheet metal section 24 of the lathe proximate to a spindle 39, such that at load condition, the receiver on the output sensor will align with the transmitter. A control processor 40 is provided to generate an input to a conventional lathe controller circuit 42. Control processor 40 monitors the output of output sensor/receiver 22 to determine sensor conditions, and is provided with suitable programming to generate a control signal which causes lathe controller 42 to interlock a lathe start cycle start or lathe feed hold cycle. Control processor 40 can be further arranged to trouble shoot for any sensor faults, such as by tracking successive indications from a particular sensor that a part has been improperly loaded even after a reload has been performed.

Overall operation of this system will now be described. Lathe control circuit 42 uses a spindle orientation detection arrangement 44 to stop the lathe drive so that rotation of chuck 12 ends when transmitter 20 and output sensor/receiver 22 are aligned. If spindle orientation is not available on the existing lathe control, the chuck can be manually rotated until the transmitter and output sensor align. An indicator light 46, such as an LED, is illuminated when the transmitter and output sensor are properly aligned.

A part is then loaded thereby causing probes 32 in chuck 12 to push back. Chuck clamps 16 are then brought into engagement to clamp the part. Control processor 40 then monitors for receipt of each separate sensor signal/channel to determine existing sensor, state i.e., energized or not energized, and compares the existing sensor states to a predetermined reference table of sensor states to determine whether the part is properly positioned. If all sensor states match the predetermined states, control processor 40 illuminates another light 48 indicating proper positioning of the part, and enables a start cycle or disables a feed hold used in lathe control 42.

In operation, transmitter 20 includes suitable circuitry for converting the inductive energy received via coil 30 to generate the needed electrical power for the transmitter and detecting sensor circuitry. Each sensor 34 in detecting sensor arrangement 18 provides a signal to the transmitter which is indicative of the position of a load part within the chuck. In other words, each proximity sensor 34 and probe 32 provides an input channel to the transmitter, which are then transmitted to receiver 22. The output sensor/receiver is positioned to respond only to signals from transmitter 20. This prevents false outputs which could result from metal chips or other metallic debris generated in typical harsh industrial environments. To ensure proper performance, the transmitter and output sensor/receiver are preferably formed having the same diameter.

Thus, the present invention provides a sensing system in which the chuck side of the system does not require direct wiring to a power source. In addition, the placement of all sensors and the transmitter within the mounting ring behind the chuck face plate minimizes system fail due to potential contact with coolant and machine chips. The present invention is particularly useful in chuck applications having a high speed of rotation. Further, housing 38 provides shielding of the output sensor as well as the power feed and output line to the control processor.

The above objects and other objects, features, and advantages of the present invention are readily apparent from the following detailed description of the best mode for carrying out the invention when taken in connection with the accompanying drawings.

What is claimed is:

1. A method for sensing positioning of a part to be machined in a rotatable machining device, wherein the rotatable machining device includes a chuck for clamping the part during machining, said method comprising:

positioning a detecting sensor arrangement and transmitter on the chuck;

positioning an output sensor on a stationary surface of the rotatable device;

generating a signal from the detecting sensor arrangement indicative of the position of the part relative to a face surface on the chuck and transmitting the generated signal from the transmitter to the output sensor;

directly coupling the output sensor to a source of electrical power; and inductively coupling the output sensor and the transmitter to provide electrical power to the transmitter and the detecting sensor arrangement.

2. The method of 1 further comprising illuminating a light when the transmitted sensor signal is indicative that the part is properly positioned.

3. The method of 1 further comprising inhibiting rotation of the machining device when the transmitted sensor signal is indicative that the part is not properly positioned.

4. A method for sensing positioning of a part to be machined in a rotatable machining device, wherein the rotatable machining device includes a chuck for clamping the part during machining, said method comprising:

positioning a detecting sensor arrangement and transmitter on the chuck;

positioning an output sensor on a stationary surface of the rotatable device;

generating a signal from the detecting sensor arrangement indicative of the position of the part relative to a face surface on the chuck and transmitting the generated signal from the transmitter to the output sensor;

directly coupling the output sensor to a source of electrical power; and inductively coupling the output sensor and the transmitter to provide electrical power to the transmitter and the detecting sensor arrangement, wherein generating a signal from the detecting sensor arrangement indicative of the position of the part comprises positioning at least one spring-loaded probe on the chuck so as to be moveable into the detection field of a corresponding proximity sensor only when a part is properly positioned within the chuck.

5. A method for sensing positioning of a part to be machined in a rotatable machining device, wherein the rotatable machining device includes a chuck for clamping the part during machining, said method comprising:

positioning a detecting sensor arrangement and transmitter on the chuck;

positioning an output sensor on a stationary surface of the rotatable device;

generating a signal from the detecting sensor arrangement indicative of the position of the part relative to a face surface on the chuck and transmitting the generated signal from the transmitter to the output sensor;

directly coupling the output sensor to a source of electrical power;

inductively coupling the output sensor and the transmitter to provide electrical power to the transmitter and the detecting sensor arrangement; and shielding the transmitter and at least a portion of the detecting sensor arrangement within a mounting ring attached to the backside of the chuck.

\* \* \* \* \*